United States Patent
Heuberger (10) Patent No.: US 10,952,561 B2
(45) Date of Patent: Mar. 23, 2021

(54) APPARATUS AND METHOD FOR PREPARING A COFFEE BEVERAGE

(71) Applicant: SPENGLER GMBH & CO. KG, Bruchsal (DE)

(72) Inventor: Ralf Heuberger, Albersweiler (DE)

(73) Assignee: SPENGLER GMBH & CO. KG, Bruchsal (DE)

( * ) Notice: Subject to any disclaimer, the term of this patent is extended or adjusted under 35 U.S.C. 154(b) by 272 days.

(21) Appl. No.: 16/073,205

(22) PCT Filed: Feb. 1, 2017

(86) PCT No.: PCT/EP2017/000122
§ 371 (c)(1),
(2) Date: Jul. 26, 2018

(87) PCT Pub. No.: WO2017/144154
PCT Pub. Date: Aug. 31, 2017

(65) Prior Publication Data
US 2019/0029463 A1 Jan. 31, 2019

(30) Foreign Application Priority Data
Feb. 25, 2016 (DE) .......................... 102016002150.0

(51) Int. Cl.
*A47J 31/42* (2006.01)
*A47J 31/36* (2006.01)
(Continued)

(52) U.S. Cl.
CPC .......... *A47J 31/42* (2013.01); *A47J 31/3614* (2013.01); *A47J 31/3619* (2013.01); *A47J 31/4467* (2013.01); *A47J 31/545* (2013.01)

(58) Field of Classification Search
CPC .... A47J 31/42; A47J 31/3614; A47J 31/4467; A47J 31/545; A47J 31/3638
See application file for complete search history.

(56) References Cited

U.S. PATENT DOCUMENTS

| | | | | |
|---|---|---|---|---|
| 5,259,296 A | * | 11/1993 | Mikael | ................ A47J 31/3614 99/280 |
| 6,173,642 B1 | | 1/2001 | Obbens et al. | |
| 2005/0016385 A1 | * | 1/2005 | Brinkemper | ............ A47J 31/52 99/280 |

FOREIGN PATENT DOCUMENTS

| | | |
|---|---|---|
| DE | 19855271 C1 | 9/2000 |
| EP | 0559620 A1 | 9/1993 |

(Continued)

*Primary Examiner* — Brian W Jennison
(74) *Attorney, Agent, or Firm* — Ohlandt, Greeley, Ruggiero and Perle, LLP (57) ABSTRACT

A coffee brewer contains a brewing unit in which coffee grounds having been poured in are compressed by a plunger driven by an actuator. Heated water flows through the compressed coffee grounds. A control device controls the actuator in accordance with signals of an angle of rotation sensor. The control device first moves the plunger against a stop in an ejection position to calibrate the sensor, then moves the plunger by a predetermined distance in a downwards direction into a pouring-in position. Afterwards the control device moves the plunger by a second distance into the brewing position, a length of the predetermined distance and the second distance corresponds to a number of pulses of the sensor which are stored in the memory. The control device subsequently moves the plunger by a third distance back into the ejection position in which the coffee grounds are removed from the plunger.

8 Claims, 6 Drawing Sheets

(51) Int. Cl.
*A47J 31/44* (2006.01)
*A47J 31/54* (2006.01)

(56) References Cited

FOREIGN PATENT DOCUMENTS

| EP | 2135533 | A2 | 12/2009 |
| EP | 2534985 | A1 | 12/2012 |
| EP | 2832269 | A1 | 2/2015 |

\* cited by examiner

APPARATUS AND METHOD FOR PREPARING A COFFEE BEVERAGE

BACKGROUND OF THE INVENTION

Field of the Invention

The invention relates to an apparatus for preparing a coffee beverage and a method for preparing a coffee beverage using such an apparatus.

In the hot drink machines currently in public use, by means of which coffee, espresso and other caffeinated hot drinks are provided in particular, the use of brewing units is known that have a brewing chamber into which dried coffee powder is filled and in which a displaceable plunger is arranged that compacts the powder after the chamber has been closed by means of a lid. Thereafter, hot water is applied to the compressed powder to dissolve the flavors contained therein and to then introduce the water as a hot drink into a cup via a corresponding dispensing unit.

In this connection, it is known from DE 198 55 271 C1 to move the plunger accommodated in the brewing chamber by means of a spindle drive comprising a simple electric motor that may be activated by an electronic control device, the rotational angular position of which is not detected during the movement of the plunger. In this case, the magnitude of the pressure exerted on the coffee powder by the plunger during the brewing process results purely accidentally from the fact that the electric motor is supplied with electric current by the control device for a set period of time, in order to move it from the filling position to the brewing position. The pressure exerted by the plunger on the coffee powder during the brewing process is subject to strong fluctuations because the travel path and thus the end position of the plunger in this case is decided by the amount of coffee powder that has been filled, the degree of grinding, and the frictional forces in the gear via which the engine drives the plunger. However, as the applicant has found, the pressure exerted by the plunger on the coffee powder during the brewing process has a very great influence on the flavor quality of the coffee beverage, which is due, among other things, to increased exudation of bitter substances from the coffee powder due to increased pressure; if the pressure generated by the plunger assumes a given ideal value, these bitter substances advantageously give greater expression to the flavor for a given type of coffee, manner of brewing, amount of coffee and degree of grinding. On the other hand, if the pressure exerted on the coffee powder by the plunger during the brewing process only slightly exceeds a certain threshold value that depends on the aforementioned parameters, the bitter substances exude from the coffee powder to a greater degree and detrimentally affect the quality of the flavor in such a way that the drink is nearly undrinkable.

SUMMARY OF THE INVENTION

Accordingly, it is an objective of the present invention to provide an apparatus and a method for preparing a coffee beverage by means of which the flavor quality of a coffee beverage, brewed in a brewing chamber using a plunger acting on the coffee powder filled therein, may be further improved.

This objective is achieved according to the invention by the features of the independent claims.

Further features of the invention are described in the dependent claims.

BRIEF DESCRIPTION OF THE SEVERAL VIEWS OF THE DRAWING

The invention will be described in the following with reference to the drawings and in terms of a preferred embodiment. The drawings show the following.

DESCRIPTION OF THE INVENTION

As shown in FIGS. 1-6, the apparatus 1 for preparing a coffee beverage according to the invention comprises a brewing unit 2 having a brewing chamber 6 that may be closed by a lid 4, which, for example, may be moved via an actuator (not shown) so as to open or close the brewing chamber 6 by means of the pins that are schematically indicated in dashed lines and are laterally arranged on the lid and are guided in the curved tracks.

In the brewing chamber 6, a plunger 14 may be moved up and down by means of an electric actuator 10 via a gear mechanism 12 to compress coffee powder 8 filled into the brewing chamber 6 before this powder is percolated through by heated water introduced into the brewing chamber 6 during the brewing process by means of an electric pump 16, and the water then emerges as a coffee beverage from an outlet (not further shown) of the brewing chamber 6. The movement of the plunger 14 is controlled by an electronic control device 18 which is connected to the actuator 10 in order to drive the plunger 14, and preferably also controls the other components, such as the pump 16 for conveying the heated water to the brewing chamber 6, as well as the boiler (not shown in detail), or the grinder, etc.

Figure 1:
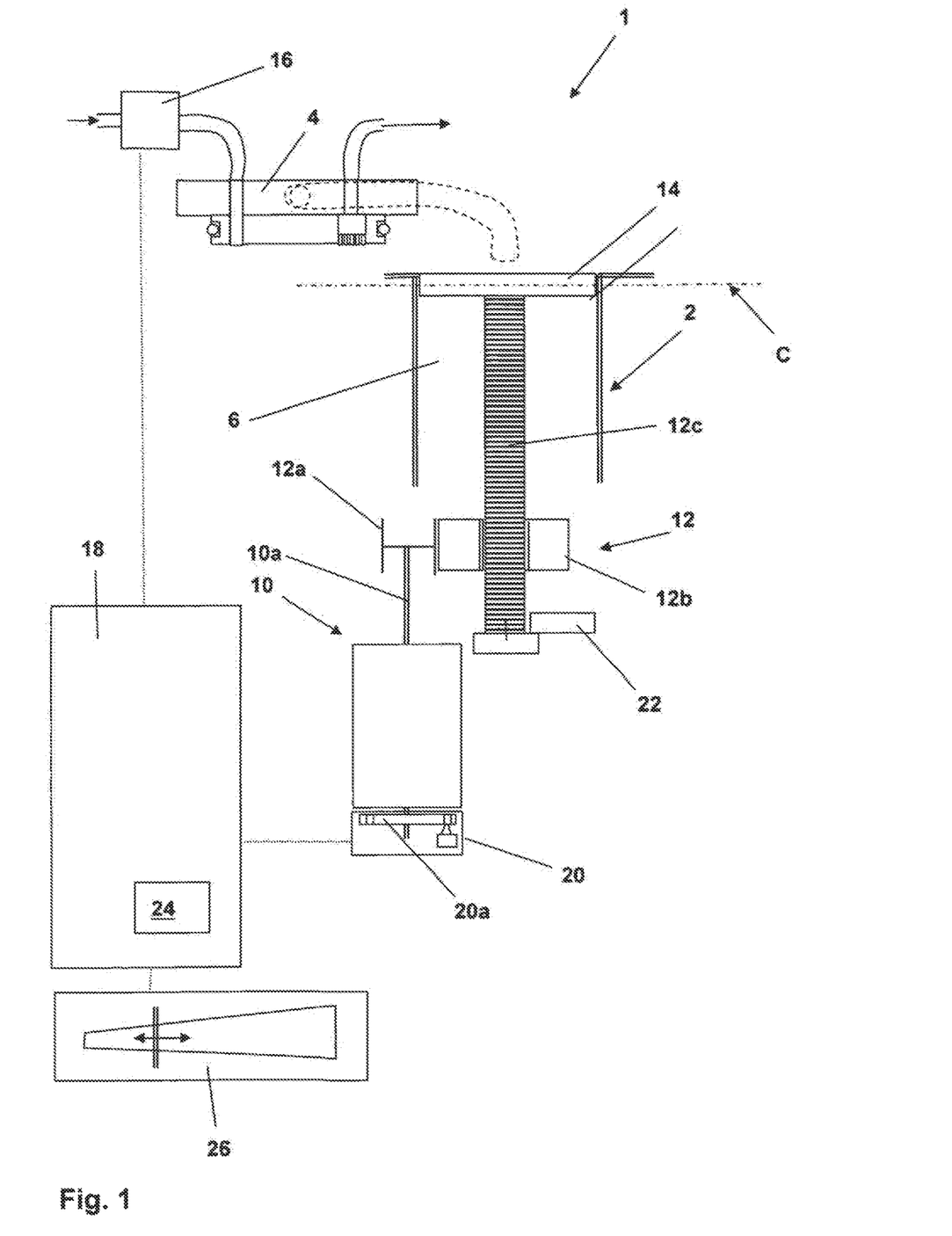
FIG. 1 shows a schematic representation of the apparatus according to the invention, wherein the plunger of the brewing unit has been moved to the ejection position.

The electronic control device 18 controls the electric actuator 10 for this purpose based on the signals of a rotary encoder 20 associated therewith in such a way that the plunger 14 is moved from a filling position A (FIG. 3) for the coffee powder 8, while the coffee powder 8 is being compressed, to a brewing position B (FIG. 5) and from there to an ejection position C (FIG. 7) for the coffee compact formed by the brewing process in the brewing chamber 6. The apparatus according to the invention is characterized in that the electronic control device 18 first moves the plunger 14 for calibrating the rotary encoder 20 against a stop 22 in the ejection position C (FIG. 1). From this ejection position C, the plunger 14 is subsequently moved by a predetermined distance in the downward direction to the filling position A, the length of that distance corresponding to a first number of pulses of the rotary encoder 20 stored in an electronic memory 24 of the electronic control device 18. After a predetermined filling time, in which the grinder (not shown in detail) is activated and the coffee powder is filled into the open brewing chamber 6 from above, and after the lid 4 is closed, the electronic control device 18 moves the plunger 14 by a second distance in the upward direction to the brewing position B, the length of that distance corresponding to the second number of pulses of the rotary encoder 20 stored in the memory 24. After the electronic control device 18 has received the corresponding second number of pulses from the rotary encoder 20—in the present application the term "pulses" is intended to include any type of pulsed electronic signals, in particular digital inputs and outputs—after a predetermined brewing time, the control device 18 moves the plunger 14 from the brewing position B by a predetermined third distance back to the ejection position A, and in this position, the compact is removed by an ejection mechanism (not shown in detail) from the plunger 14 after the lid 4 is opened.

The invention has the advantage that the calibration of the rotary encoder 20 takes place with the lid open and with no pressure load acting on the plunger 14. As a result, the errors in the calibration process caused by frictional forces are kept as low as possible, which in turn means that the positional error in the movement of the plunger 14 to the brewing position B with the coffee powder 8 under compression is also reduced, and the plunger may be moved to the brewing position with considerably higher accuracy. This increased accuracy in the movement of the plunger 14 to the brewing position while the coffee powder is being compressed creates the possibility of reproducibly adjusting, with an extremely high accuracy, the pressure that the plunger exerts on the coffee powder during the brewing process.

Due to the travel path of the plunger 14 when moving to the brewing position B being derived solely from the pulses of the previously calibrated rotary encoder 20, the advantage results compared to a pure time-controlled positioning or a positioning via the received motor current of the electric actuator 10, that the end position achieved for the brewing process is almost independent of the frictional forces that occur.

Compared with a likewise conceivable measurement of the compressive force of the plunger on the coffee powder 8 by a pressure sensor, such as a piezoelectric pressure sensor, the solution according to the invention has the advantage that the determined compressive force that in this case acts between the plunger and the drive element does not depend on the temperature in the region of the sensor, but solely on the number of pulses generated by the rotary encoder 20 and supplied to the control device 18. Because the number of pulses generated by the rotary encoder is not affected by the temperature, which may vary considerably in the brewing chamber 6 and also below the plunger 14 between the filling of the brewing chamber and the brewing process, due to the introduction of hot water, the pressure exerted on the coffee powder 8 by the plunger 14 during the brewing process is subject to almost no influences from temperature.

In the preferred embodiment of the apparatus 1 according to the invention, the electric actuator 10 is a direct current electric motor that drives a spindle drive 12*b* for a threaded spindle 12*c* to which the plunger 14 is coupled, via a gearwheel 12*a* fixed to the drive shaft 10*a* of the actuator. The rotary encoder 20 is a perforated disk or slotted disk rotatably coupled to the drive shaft 10*a* of the electric motor, which as shown in FIGS. 1 to 6 is preferably arranged on the end of the drive shaft 10*a* opposite the gearwheel 12*a*.

Figure 2:
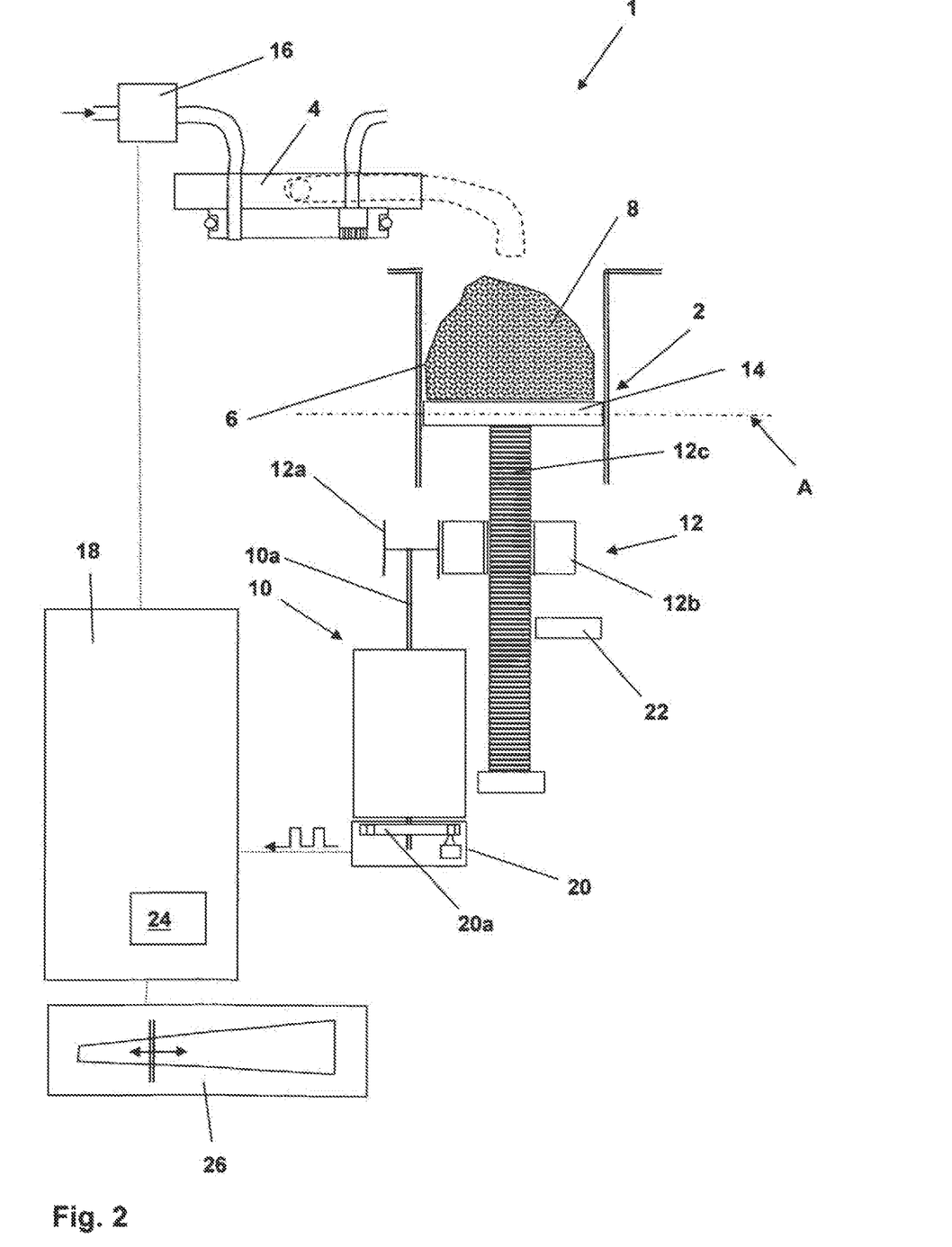
FIG. 2 shows the apparatus of FIG. 1 after the plunger has been moved to the filling position.
Figure 3:
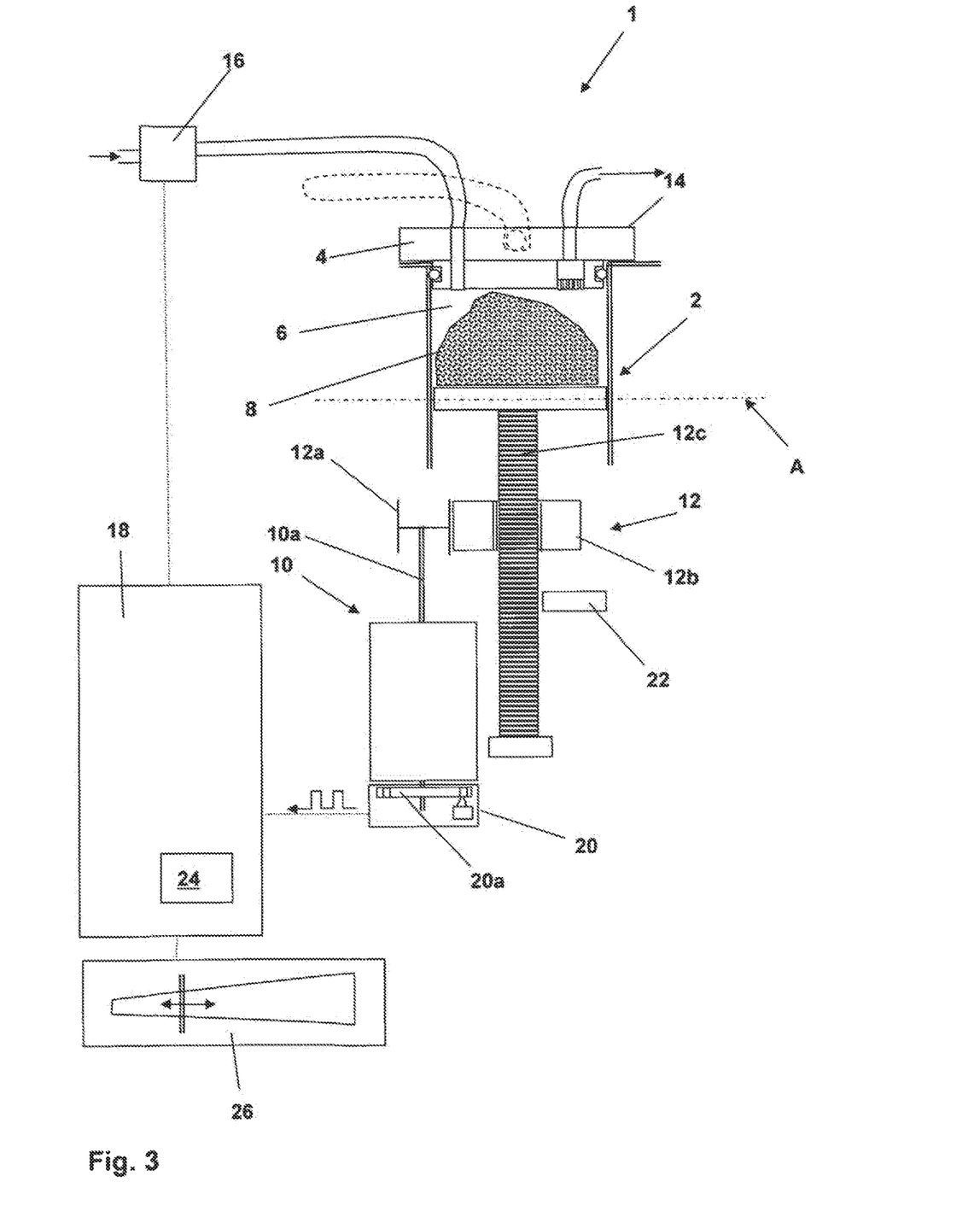
FIG. 3 shows the apparatus of FIG. 1 after closing the lid.
Figure 4:
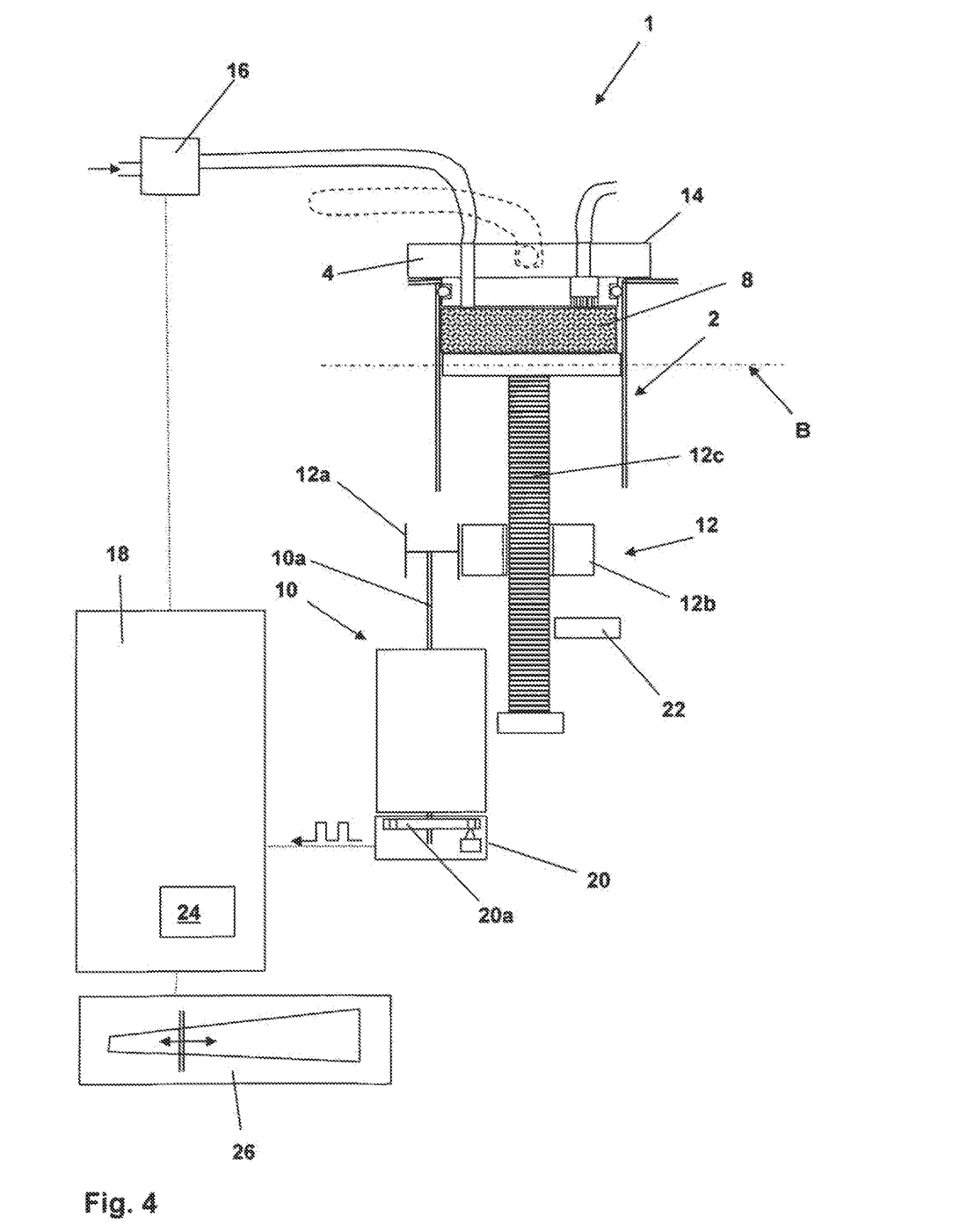
FIG. 4 shows the apparatus of FIG. 1, wherein the plunger has been moved from the filling position to the brewing position while the coffee powder has been compressed.
Figure 5:
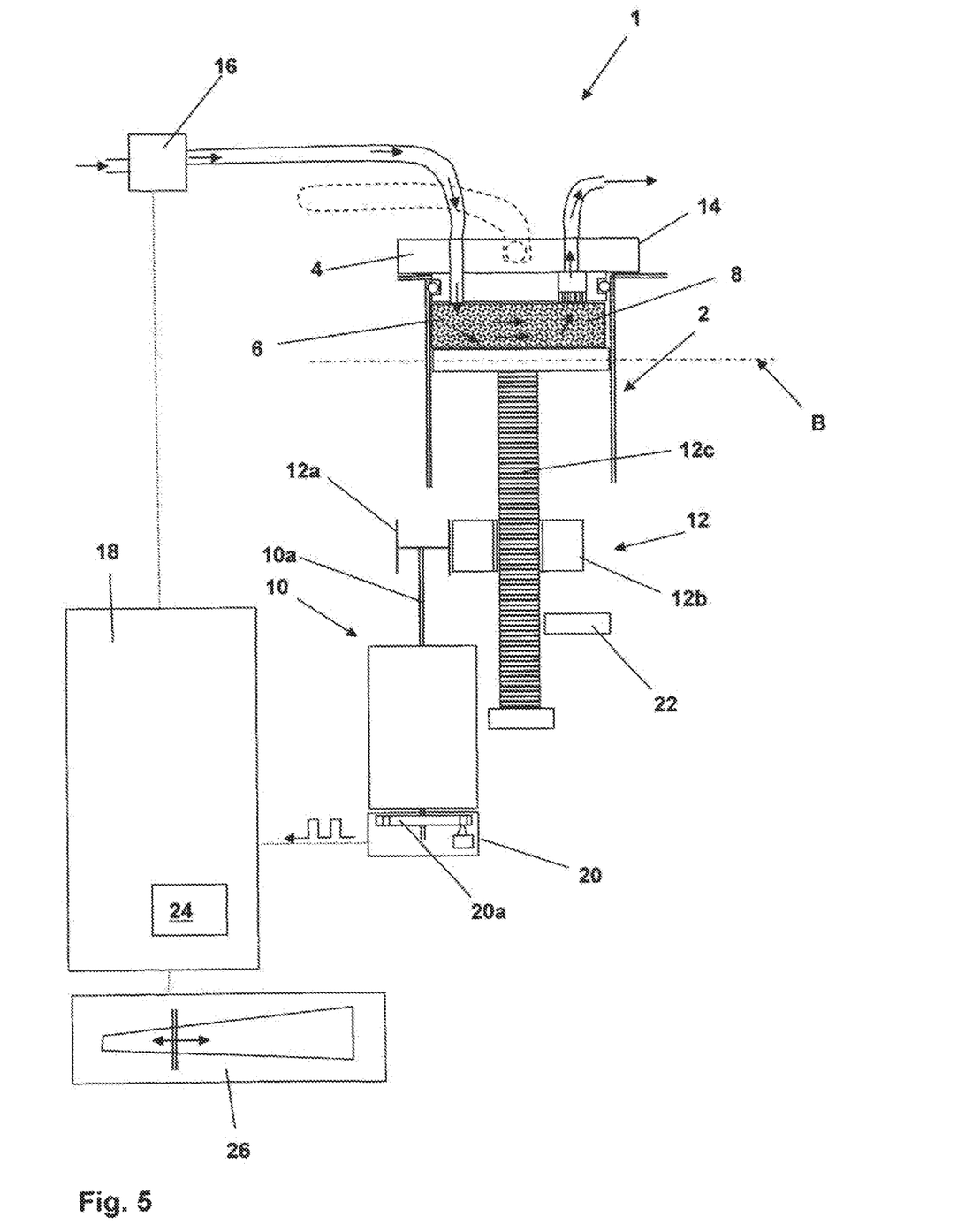
FIG. 5 shows the apparatus of FIG. 1 during the brewing process.
Figure 6:
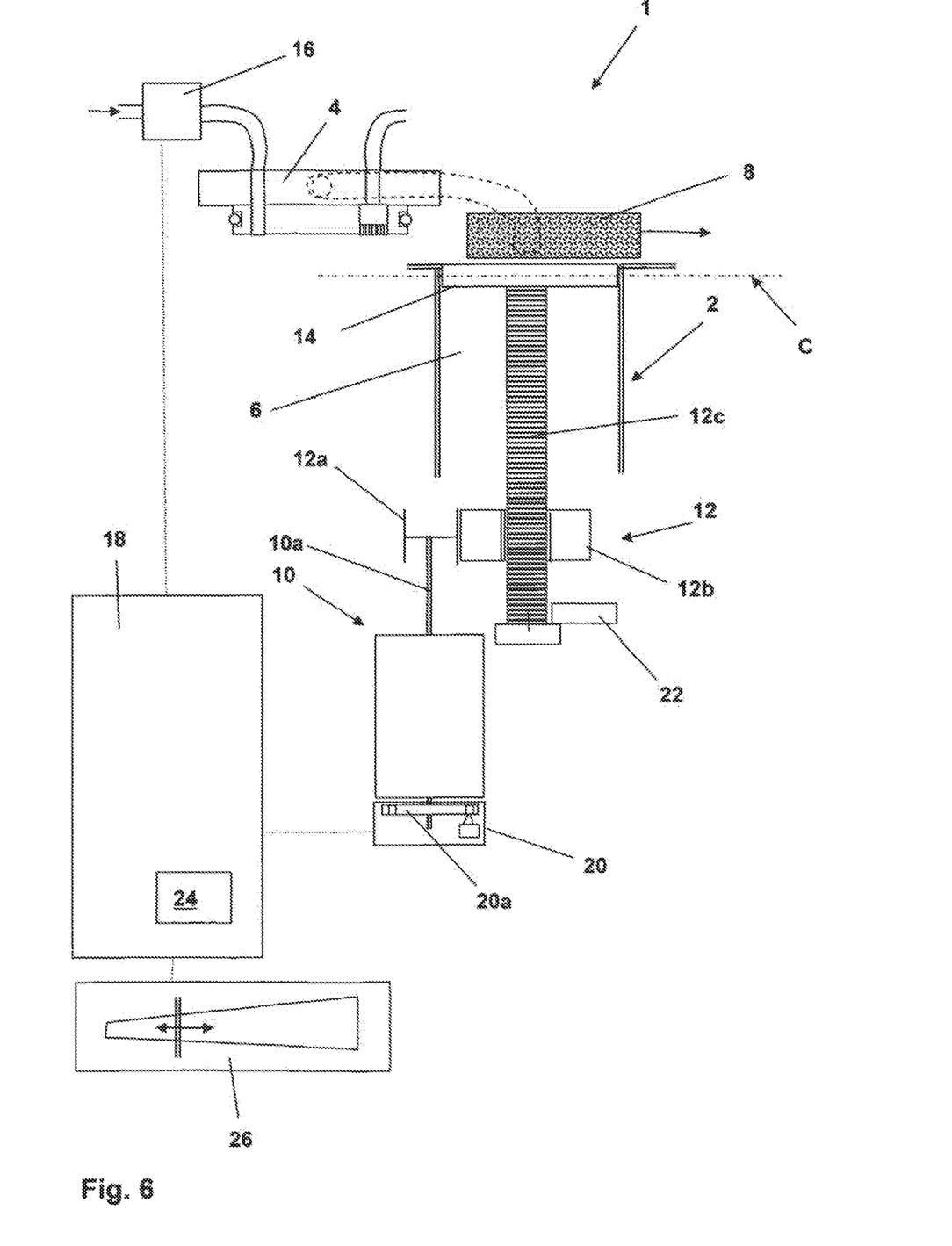
FIG. 6 shows the apparatus of FIG. 1 after opening the lid and moving the plunger to the ejection position.

In the preferred embodiment of the invention, when moving the plunger from the initialization position shown in FIG. 1 or the ejection position A to the filling position shown in FIG. 2 via the maximum travel path, the rotary encoder 20 may for example generate 680 pulses. Here, a 1 mm movement of the plunger 14, for example corresponds to 15 pulses. It is understood that the number of pulses per millimeter of travel path may be chosen differently by a corresponding reduction of the gear 12 or the spindle drive.

According to another idea underlying the invention, the apparatus 1 has an input means 26 connected to the electronic control device 18, in particular a first electrical switch, by the operation of which the number of pulses associated with the second distance may be increased or decreased stepwise in the memory 24, in order to increase or decrease the pressure that the plunger 14 applies to the coffee powder 8 in the brewing position B.

The mode of operation of the apparatus 1 according to the invention will be explained in greater detail below with reference to the method for preparing a coffee beverage in which the above-described apparatus 1 is used.

In this case, the method according to the invention is characterized by the following method steps:

a) inputting a desired type of coffee, coffee strength and a flavor parameter associated with the type of coffee, and b) increasing or decreasing value a stored in the memory 24 for the second number of pulses generated by the rotary encoder 20 during the movement of the plunger 14 by the second distance from the filling position A to the brewing position B based on the input flavor parameter, c) filling of an amount of coffee powder 8 associated with the type and strength of coffee into the brewing chamber 6, d) moving the lid 4 into the closed position, e) moving the plunger 14 from the filling position A by the second distance toward the ejection position C under compression of the coffee powder, until the rotary encoder 14 generates the second number of pulses that has been increased or decreased based on the flavor parameter, f) activating the pump 16 for a predetermined period of time to introduce a predetermined amount of hot water into the brewing chamber 6, and then deactivating the pump, g) opening the lid 4 and moving the plunger 14 to the ejection position A, and h) removing the coffee compact from the plunger.

In the method described above, it is particularly advantageous if after the deactivation of the pump 16, in order to squeeze the coffee compact, the plunger 14 is moved from the brewing position B to a squeezing position D by a fourth distance toward the ejection position C until the rotary encoder 14 has generated a number of pulses corresponding to the fourth distance, which is stored in the memory 24. By squeezing the coffee powder 8 to which hot water was previously applied, the advantage results that a dry coffee powder compact is formed that may be easily pushed down by the plunger 14 in the ejection position A by means of a pusher or the like, which may also be attached to the lid 4, without leaving aqueous residues on the plunger that adversely affect the taste of the coffee beverage in a subsequent brewing process.

Furthermore, it may be advantageous if in the method according to the invention, after deactivation of the pump 16 and before opening the lid 4, a valve arranged in the water supply line to the brewing chamber 6 is opened in order to draw off the brewing pressure generated in the brewing chamber 6 during the brewing process from the brewing chamber 6 before opening the lid 4.

According to another idea underlying the invention, the value stored in the memory 24 for the second number of pulses is additionally increased or decreased based on the coffee strength that was input and stored in the memory 24, in such a way that when the amount of coffee powder 8 filled into the brewing chamber 6 is increased, the second number of pulses is reduced and the second distance is shortened accordingly. This takes into account the fact that there is no increase in the pressure exerted by the plunger 14 on the coffee powder 8 due to the increased coffee volume in the brewing position B, which would lead to leakage of additional bitter substances, but the position of the plunger 14 in the brewing position is corrected accordingly, in order to obtain the original preset pressure value, or the pressure value corrected via the input means 26, despite the increased volume of coffee powder 8.

According to a further advantageous embodiment of the method according to the invention, the value stored in the memory 24 for the second number of pulses is additionally increased or decreased based on a value stored in the memory 24 for the type of coffee, in such a way that in the case of a more heavily roasted coffee, the second number of pulses is reduced and the second distance is shortened accordingly. This results in the advantage that for different strengths of roasted types of coffee, a corresponding correction of the pressure value may be made by means of which the quality of the coffee beverage produced during the brewing process may be adjusted individually to the preferences of the respective user.

In this context, it may furthermore be provided that the value stored in the memory 24 for the second number of pulses may be stored together with an individual user index as a fixed value in the memory 24 of the electronic control device 18. In this case, it is of particular advantage if additional input means 26 are furnished, via which the stored value may be retrieved by entering the individual user index for a next brewing process, in order to move the plunger 14 from the filling position A to the brewing position B by the second distance, until the rotary encoder 20 has generated the second number of pulses retrieved from the memory 24.

Furthermore, it is advantageous for shortening the dispensing time of the coffee beverage, if the plunger 14 moves from the ejection position C to the filling position A and/or from the filling position A to an intermediate position between the brewing position B and the filling position A at a speed higher than the speed at which the plunger 14 is moved from the intermediate position to the brewing position.

Finally, according to another idea underlying the invention, it may be provided that the change over time of the pulses generated by the rotary encoder 20 during the movement of the plunger 14 from the filling position A to the brewing position B by the second distance is detected by the electronic control device 18 and compared with a predetermined threshold value, in particular stored in memory 24, and in that the electronic control device 18 generates a warning signal upon the value falling below the threshold value, which indicates to the operator that there is a lack of coffee in the coffee reservoir. By monitoring the change over time of the pulses generated by the rotary encoder 20 during the movement of the plunger 14 over the second distance, which are proportional to the rotation rate of the drive motor, it is made possible to detect the lack of coffee beans, or in simple apparatuses without grinders, the lack of coffee powder in the reservoir, in the simplest way without an additional level sensor in the coffee reservoir. This is due to the fact that, if there is too little or no coffee powder that has been filled into the brewing chamber in the filling position A, in the movement of the plunger 14 to the brewing position B no compression-related resistance pressure is generated by the coffee powder, which leads to a proper filling amount in that the rate of rotation detected by the speed sensor 20 decreases and falls below the threshold value. In other words, the absence of the decrease in the rate of rotation is determined by the electronic control device by comparing the rate of rotation with a predetermined setpoint or threshold value and in this case generating a warning signal that indicates to the user that there is a lack of coffee beans or coffee powder in the reservoir.

LIST OF REFERENCE SIGNS

1 Apparatus
2 Brewing unit
4 Lid
6 Brewing chamber
8 Coffee powder
10 Electric actuator
10a Drive shaft
12 Mechanical gear
12a Gearwheel on drive shaft
12b Spindle drive
12c Threaded spindle
14 Piston
16 Pump
18 Electronic control device
20 Rotary encoder
22 Stop
24 Electronic memory
26 Input means
A Filling position of the plunger
B Brewing position of the plunger
C Ejection position of the plunger

The invention claimed is:

1. A method for preparing a coffee beverage using a coffee brewer, which comprises the steps of:
inputting a desired type of coffee, coffee strength and a flavor parameter associated with the desired type of coffee;
increasing or decreasing a value stored in a memory for a second number of pulses generated by a rotary encoder during a movement of a plunger over a second distance from a filling position to a brewing position based on the flavor parameter;
filling an amount of coffee grounds associated with the desired type of coffee and the coffee strength into a brewing chamber;
moving a lid into a closed position;
moving the plunger from the filling position by the second distance toward an ejection position under compression of the coffee grounds, until the rotary encoder generates the second number of pulses that has been increased or decreased based on the flavor parameter;
activating a pump for a predetermined period of time to introduce a predetermined amount of hot water into the brewing chamber, and then deactivating the pump;
opening the lid and moving the plunger to the ejection position; and
removing a coffee compact from the plunger.

2. The method according to claim 1, wherein after a deactivation of the pump, in order to squeeze the coffee compact, the plunger is moved from the brewing position to a squeezing position by a fourth distance toward the ejection position until the rotary encoder has generated a number of pulses corresponding to the fourth distance, which is stored in the memory.

3. The method according to claim 1, wherein after a deactivation of the pump and before opening the lid, a valve arranged in a water supply line to the brewing chamber is opened in order to draw off brewing pressure generated during a brewing process in the brewing chamber from the brewing chamber before opening the lid.

4. The method according to claim 1, wherein the value stored in the memory for the second number of pulses is additionally increased or decreased based on the coffee strength that was input and stored in the memory, in such a way that when an amount of the coffee grounds filled into the brewing chamber is increased, the second number of pulses is reduced, and the second distance is shortened accordingly.

5. The method according to claim 1, wherein the value stored in the memory for the second number of pulses is additionally increased or decreased based on a value stored in the memory for the type of coffee, in such a way that in a case of a more heavily roasted coffee, the second number of pulses is reduced and the second distance is shortened accordingly.

6. The method according to claim 1, wherein the value stored in the memory for the second number of pulses may be stored together with an individual user index as a fixed value in the memory of the electronic control device, and in that input means are furnished, via which the stored value may be retrieved by entering the individual user index for a next brewing process, in order to move the plunger from the filling position to the brewing position by the second distance, until the rotary encoder has generated the second number of pulses retrieved from the memory.

7. The method according to claim 1, wherein the plunger moves from the ejection position to the filling position and/or from the filling position to an intermediate position between the brewing position and the filling position at a speed higher than a speed at which the plunger is moved from the intermediate position to the brewing position.

8. The method according to claim 1, wherein a change over time of the pulses generated by the rotary encoder during a movement of the plunger from the filling position to the brewing position by the second distance is detected by the electronic control device and compared with a predetermined threshold value, stored in the memory, and in that the electronic control device generates a warning signal upon a value falling below the threshold value, which indicates to an operator that there is a lack of coffee in a coffee reservoir.

* * * * *